Oct. 22, 1929.                G. A. SUTTON                1,732,918
                              TIRE POP VALVE
                           Filed April 19, 1928

INVENTOR
                           GEORGE A. SUTTON.
                    BY
                                    ATTORNEY

Patented Oct. 22, 1929

1,732,918

UNITED STATES PATENT OFFICE

GEORGE A. SUTTON, OF PONTIAC, MICHIGAN, ASSIGNOR TO TIRE POP-VALVE COMPANY, A CORPORATION OF MICHIGAN

TIRE POP VALVE

Application filed April 19, 1928. Serial No. 271,188.

My invention has for its primary object the provision of economical and efficient means for automatically gauging the pressure which is applied to an inflatable tire or the like.

Another object is to provide a construction wherein an audible pop or similar noise is made when a predetermined pressure has been reached.

Another object is to provide a construction wherein the pop valve mechanism is enclosed with a suitable housing which will prevent accidental disassembly of the parts and at the same time shield them from dirt or the like.

Another object is to provide a simple and efficient spring through which control of the pressures at which the pop valve will operate may be had.

With the above and other objects in view, my invention consists in the arrangement, combination and construction of the various parts of my improved device as described in the specification, claimed in my claims and shown in the accompanying drawings, in which:

Figures 1, 2:
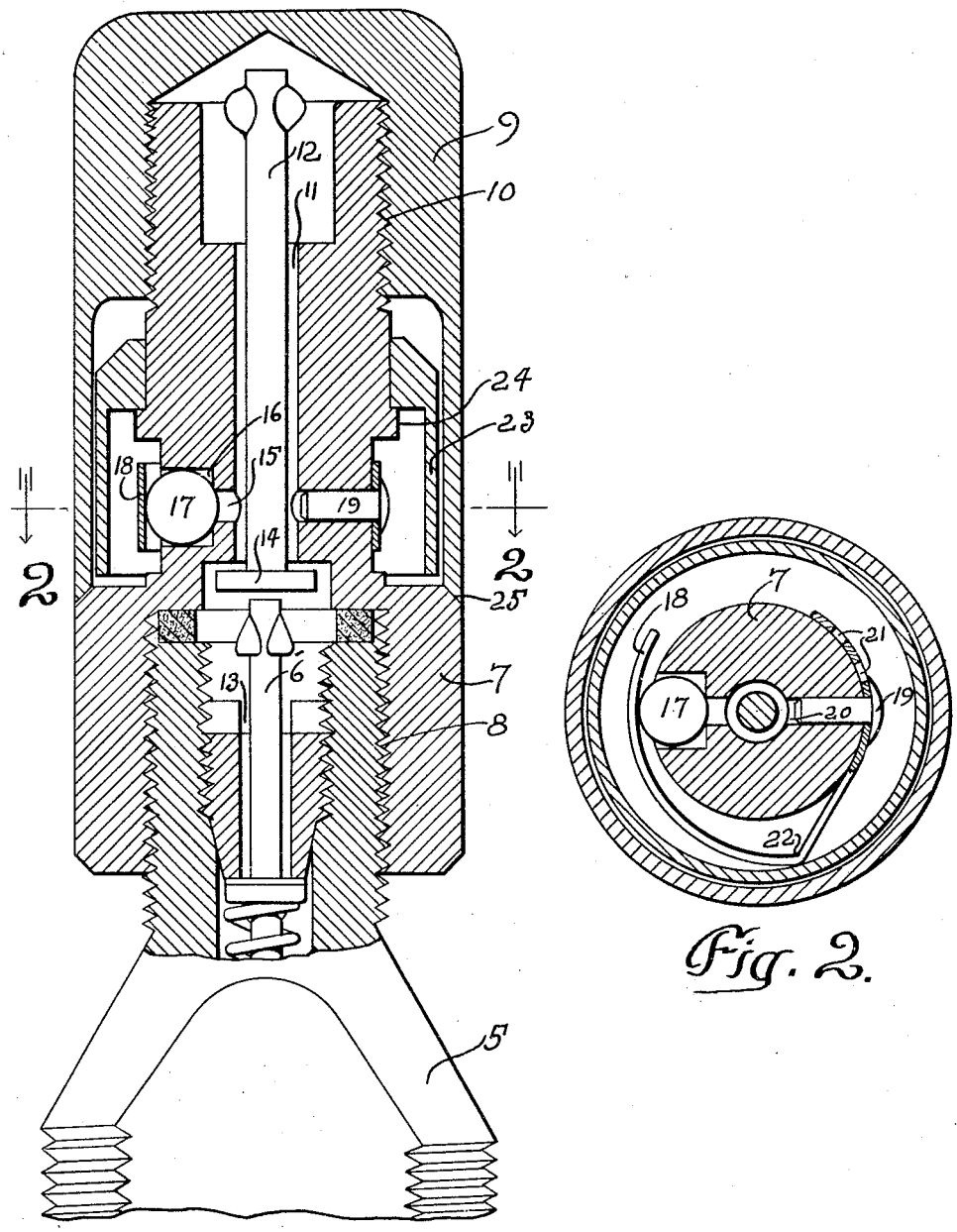
Fig. 1 is a central longitudinal section of my improved device assembled to the valve stem of a tire valve.
Fig. 2 is a sectional view taken on line 2—2 of Fig. 1.

I have shown a conventional tire valve 5 having a conventional valve stem 6 extended therefrom. My improved pop valve may be applied to the tire valve only when it is desired to supply air to the tire or may be left on the tire valve continuously.

My improved pop valve comprises a portion 7 which is adapted to be threaded on the tire valve as at 8 and which is adapted to have a cover 9 screwed thereon as at 10. The member 7 is provided with a central aperture 11 through which a stem 12 extends. The sizes of the opening 11 and stem 12 are such that air may pass through the opening 11 around the stem 12 no faster than it may pass through the opening 13 in the tire valve stem into the tire. The stem 12 projects slightly above the upper end of the member 7 so that when an inflating nipple is placed over the upper end of the member 7 the stem 12 may be displaced with its head 14 bearing on the end of the stem 6 so as to displace the stem 6 and permit the entry of air through the opening 13 and tire valve 5 into the tire.

An opening 15 is provided in the inside of the member 7 extending from a point in the passage or opening 11 outwardly to an enlarged opening 16 which communicates with the atmosphere. A ball 17 is provided in the enlarged opening 16, said ball fitting with relative closeness in the enlarged opening and seating in the outer end of the opening 15 so that a small portion of the ball is exposed through the opening 15 to the opening 11. The ball 17 is held in place by a spring 18 which passes over the outer face thereof. The spring 18 is formed from flat metal and is of somewhat V shaped formation. The end of the spring which is farthest removed from the ball 17 is adapted to be secured to the member 7 by a rivet 19 which passes through an opening in the spring into an opening 20 in the member 7. A plurality of openings, indicated at 21, may be provided in the spring 18 through each of which the spring may be fastened by the rivet 19 to the member 7, it being readily apparent that the length of the lever arm portion of the spring bearing on the ball 17 may be changed by locating the rivet 19 in various of the openings 21. That is to say the central point 22 on the spring 18, which bears against the inner periphery of an enclosing hood or casing 23, will have its bearing point at a greater or lesser distance from the ball 17, dependent upon which of the openings 21 is utilized for securing the spring in place, with the result that the ball 17 will be pressed with greater or lesser force against its seat in the opening 15. The hood or casing 23 is mounted on a flange or projection 24 which is provided on the member 7 above the ball 17 and the spring 18 and serves not only to control the bearing point 22 of the spring 18 but also serves to prevent complete displacement of the ball 17 from the enlarged opening 16 as well as to protect the operating parts of the pop valve from dirt, water or the like.

When air is not being introduced into the tire the cover 9 may be screwed in place, it being noted that the lower end thereof bears as at 25 against the member 7 below the ball 17, the connection between the two being a tapered one so as to form a seal to prevent the entry of dirt, water or the like to the tire pop valve. The cap 9 is removed only when air is about to be introduced into the tire.

It will be readily understood that in view of the fact that only a small portion of the ball 17 is exposed to the air in the opening 11 through the opening 15 there will be much lesser outward force exerted on the ball when it is seated in the opening 15 than when it is unseated therefrom because of the fact that as soon as the ball is unseated it is exposed over the area of its diameter to the air passing through the opening 15 with the result that as soon as the ball is slightly unseated the inrush of air will act to pop the ball away from its seat in the opening 15 producing a distinct noise which will be readily understood by the operator and which will open wide a passage from the opening 11 so as to prevent the further building up of air pressure through the opening 13 into the tire. This sudden opening of the pop valve is much to be desired and is quite preferable to one where the air slowly leaks past the valve after a predetermined pressure has been reached.

It will be obvious that various changes may be made in the arrangement, combination and construction of the various parts of my improved device without departing from the spirit of my invention and it is my intention to cover by my claims such changes as may reasonably be included within the scope thereof.

What I claim is:

1. A tire pop valve comprising a member having an opening therein adapted to communicate with a tire valve stem, said member having a second opening leading from the first, a valve member seating in said second opening with a relatively small portion of its area exposed to air from the first opening and means for exposing a large portion of the valve to the air from the first opening when the valve becomes unseated and in advance of a material flow of air past said valve member whereby to cause the valve to pop open.

2. A tire pop valve comprising a member having an opening therein adapted to communicate with a tire valve stem, said member having a second opening leading from the first, said second opening having a large and a small portion, a valve member positioned in the large portion and seating in the small portion with a relatively small portion of its area exposed to air from the first opening, the large portion of the second opening so fitting around the valve member as to tend to stop air escaping around the valve when it is slightly opened, thereby so exposing a large area of the valve to air from the first opening to cause the valve to pop open.

3. A tire pop valve comprising a member having an opening therein adapted to communicate with a tire valve stem, said member having a second opening leading from the first, a valve member seating in the second opening, a flat spring fastened to said first member and extending over said valve member to hold it normally closed, said spring having variable attaching portions whereby to enable it to be shifted on the first mentioned member corcumferentially of the first mentioned opening whereby its pressure on the valve member may be adjusted, and a hood enclosing the valve and spring, acting as a stop for the spring and as a foreign matter protector.

4. A tire pop valve comprising a member having an opening therein adapted to communicate with a tire valve stem, said member having a second opening leading from the first, a valve member seating in the second opening, a flat spring fastened to said first member and extending over said valve member to hold it normally closed, said spring being bent to an acute angle intermediate its ends, a hood around the spring, said bent portion of the spring bearing inside the hood, and means for adjusting the points of bearing of the spring on the hood to adjust the tension exerted by the spring on the valve.

5. A tire pop valve comprising a member having an opening therein adapted to communicate with a tire valve stem, said member having a second opening leading from the first, said second opening having a large and a small portion, a valve member having a portion substantially conforming in size and shape to the large portion, said valve member being positioned in the large portion and seating in the small portion with a relatively small part of its area exposed to air from the first opening and movable a material amount in said large portion before permitting the escape of a material amount of air therethrough.

6. A tire pop valve comprising a member having an opening therein adapted to communicate with a tire valve stem, said member having a relief passage leading from said opening, a valve member adapted to close said passage, and a flat spring secured to the first mentioned member bearing on said valve member and constantly urging it towards passage closing position, said spring being secured to said first mentioned member by means permitting it to be shifted circumferentially of said first mentioned member to vary the pressure of said spring on said valve member.

7. A tire pop valve comprising a member having an opening therein adapted to communicate with a tire valve stem, said member being provided with a laterally extending escape vent for said opening, a valve member for said vent, a spring secured to the first mentioned member constantly urging said valve member towards vent closing position, and a hood on said first mentioned member enclosing said spring and said valve member.

8. A tire pop valve comprising a member having an opening therein adapted to communicate with a tire valve stem, said member being provided with a laterally extending escape vent for said opening, a valve member for said vent, a spring secured to the first mentioned member constantly urging said valve member towards vent closing position, and a hood on said first mentioned member enclosing said spring and said valve member, said hood acting as a stop for limiting the movement of said spring.

9. A tire pop valve comprising a member having an opening therein adapted to communicate with a tire valve stem, said member being provided with a laterally extending escape vent for said opening, a valve member for said vent, a spring secured to the first mentioned member constantly urging said valve member towards vent closing position, and a hood on said first mentioned member enclosing said spring and said valve member, said hood limiting the outward movement of said spring when said valve member is moved to open position whereby to prevent said valve member from becoming displaced from its normal path of travel relative to said vent.

10. In combination, a hollow casing having an inlet and an outlet, means cooperating therewith for limiting the flow of air therethrough in one direction, said casing having an opening through the side wall thereof between said means and said inlet, said opening having a small portion communicating with the hollow interior of said casing and a large portion communicating with the exterior of said casing forming a shoulder between said portions, and means for limiting the pressure that may be built up between said inlet and said means comprising a valve member received in said large portion of said opening and seating against said shoulder, and spring means constantly urging said valve member toward said shoulder, said valve member substantially filling said large portion and said large portion being of a depth to necessitate said valve member moving a material distance away from said shoulder before permitting a substantial flow of air through said opening.

GEORGE A. SUTTON.